US010024569B2

(12) United States Patent
Duffy (10) Patent No.: US 10,024,569 B2
(45) Date of Patent: Jul. 17, 2018

(54) FIRE-RATED MODULAR DUCT ASSEMBLY AND IMPROVEMENTS THEREIN

(71) Applicant: William Christopher Duffy, Thornhill (CA)

(72) Inventor: William Christopher Duffy, Thornhill (CA)

(\*) Notice: Subject to any disclaimer, the term of this patent is extended or adjusted under 35 U.S.C. 154(b) by 368 days.

(21) Appl. No.: 14/051,016

(22) Filed: Oct. 10, 2013

(65) Prior Publication Data

US 2015/0101697 A1   Apr. 16, 2015

(51) Int. Cl.

| F16L 9/14 | (2006.01) |
|---|---|
| F16L 9/18 | (2006.01) |
| F24F 13/02 | (2006.01) |
| F16L 23/14 | (2006.01) |
| F16L 57/04 | (2006.01) |
| F16L 9/00 | (2006.01) |

(52) U.S. Cl.
CPC .......... *F24F 13/0209* (2013.01); *F16L 9/003* (2013.01); *F16L 23/14* (2013.01); *F16L 57/04* (2013.01); *F24F 13/0263* (2013.01); *F24F 13/0281* (2013.01); *F24F 2221/30* (2013.01)

(58) Field of Classification Search
CPC ..... F24F 13/0209; F24F 13/0263; F16L 23/16
USPC .................. 138/149, 106–108, 111, 112, 148
See application file for complete search history.

(56) References Cited

U.S. PATENT DOCUMENTS

| 624,715 A | 5/1899 | Wenz |
|---|---|---|
| 1,986,965 A | 1/1935 | Harrison |
| 1,992,574 A | 2/1935 | Jenkins |
| 2,183,174 A | 12/1939 | Wiley |
| 2,226,523 A | 12/1940 | Peck |
| 2,916,054 A * | 12/1959 | Callan ............... F16L 9/003 138/141 |
| 3,003,794 A | 10/1961 | Burley |
| 3,123,880 A | 3/1964 | Barry et al. |
| 3,198,561 A | 8/1965 | Witt |
| 3,351,699 A | 11/1967 | Merckle |
| 3,630,549 A | 12/1971 | Grimm |
| 3,800,846 A | 4/1974 | Kurz |
| 3,811,714 A | 5/1974 | Pintard |
| 3,923,326 A | 12/1975 | Mez |
| 4,133,566 A | 1/1979 | Miller |
| 4,380,188 A | 4/1983 | Nichols |
| 4,509,778 A | 4/1985 | Arnoldt |
| 4,537,430 A | 8/1985 | Sullivan |
| 4,557,297 A | 12/1985 | Montana |
| 4,572,553 A | 2/1986 | Geldner |
| 4,662,661 A | 5/1987 | Arnoldt |

(Continued)

FOREIGN PATENT DOCUMENTS

| CA | 2357078 | 12/2002 |
|---|---|---|
| CA | 2450977 | 5/2005 |

(Continued)

*Primary Examiner* — Vishal Pancholi (74) *Attorney, Agent, or Firm* — Cognitive IP Law (57) ABSTRACT

A fire-rated exhaust duct system comprising a modular configuration or structure. The fire-rated exhaust duct system comprises a plurality of exhaust duct sections. Each of the exhaust duct sections is configured to be joined or connected with other exhaust duct sections in the field or at an installation site, e.g. in building housing a kitchen facility or a laboratory facility to form longer sections or runs for exhaust duct system.

20 Claims, 9 Drawing Sheets

(56) References Cited

U.S. PATENT DOCUMENTS

| | | | |
|---|---|---|---|
| 4,725,083 A | 2/1988 | Schauer | |
| 4,765,375 A | 8/1988 | Nakajima | |
| 4,804,207 A | 2/1989 | Berchem et al. | |
| 4,836,585 A | 6/1989 | Schauer | |
| 4,859,320 A | 8/1989 | Beall, Jr. | |
| 4,913,127 A | 4/1990 | Dugger | |
| 4,940,264 A | 7/1990 | Mez | |
| 4,951,716 A | 8/1990 | Tsunoda | |
| 5,024,251 A | 6/1991 | Chapman | |
| 5,067,278 A | 11/1991 | Lyons | |
| 5,069,484 A | 12/1991 | McElroy | |
| 5,103,549 A | 4/1992 | Meinig et al. | |
| 5,129,690 A | 7/1992 | Meinig et al. | |
| 5,133,580 A | 7/1992 | Meinig | |
| 5,135,270 A | 8/1992 | Arnoldt et al. | |
| 5,165,189 A | 11/1992 | Besal | |
| 5,171,184 A | 12/1992 | Saucier et al. | |
| 5,219,403 A | 6/1993 | Murphy | |
| 5,356,048 A | 10/1994 | Geiser | |
| 5,378,028 A | 1/1995 | Issagholian-Havai et al. | |
| 5,450,879 A | 9/1995 | Toben | |
| 5,538,377 A | 7/1996 | Stewart et al. | |
| 5,564,758 A | 10/1996 | Tiberio | |
| 5,575,131 A | 11/1996 | Menchetti | |
| 5,653,482 A | 8/1997 | Ficchi, Jr. | |
| 5,673,947 A | 10/1997 | DeWaal | |
| 5,753,855 A | 5/1998 | Nicoli | |
| 5,775,414 A | 7/1998 | Graham | |
| 5,865,478 A | 2/1999 | Lin | |
| 5,898,132 A | 4/1999 | Lee | |
| 5,901,502 A | 5/1999 | Rafalski et al. | |
| 5,944,060 A * | 8/1999 | MacKay | F16L 23/14 138/137 |
| 6,109,665 A | 8/2000 | Meinig | |
| 6,143,984 A | 11/2000 | Auteri | |
| 6,148,867 A | 11/2000 | Matthews et al. | |
| 6,156,977 A | 12/2000 | Benito-Navazo | |
| 6,188,024 B1 | 2/2001 | Benito-Navazo | |
| 6,213,522 B1 | 4/2001 | Jacobson et al. | |
| 6,231,704 B1 | 5/2001 | Carpinetti | |
| 6,412,519 B1 | 7/2002 | Goodhue | |
| 6,460,573 B1 | 10/2002 | Fischer et al. | |
| 6,471,256 B1 | 10/2002 | Fischer | |
| 6,502,716 B1 | 1/2003 | Kolesar | |
| 6,505,864 B1 | 1/2003 | Shuey | |
| 6,547,287 B1 | 4/2003 | Shah et al. | |
| 6,550,823 B1 | 4/2003 | Siegwart | |
| 6,561,553 B1 | 5/2003 | Issagholian-Havai | |
| 6,758,502 B2 | 7/2004 | Mattsson et al. | |
| 6,848,720 B2 | 2/2005 | Carns et al. | |
| 7,195,290 B2 | 3/2007 | Duffy | |
| 7,501,576 B2 | 3/2009 | Gagliardi | |
| 7,699,078 B1 * | 4/2010 | Husmann, Jr. | F16L 59/04 138/114 |
| 8,178,781 B2 | 5/2012 | Duffy | |
| 8,276,319 B2 | 10/2012 | Duffy | |
| 2002/0121778 A1 | 9/2002 | Tigerfeldt | |
| 2003/0006611 A1 | 1/2003 | Shuey | |
| 2003/0160452 A1 | 8/2003 | Mattsson et al. | |
| 2005/0116470 A1 | 6/2005 | Duffy | |

FOREIGN PATENT DOCUMENTS

| | | |
|---|---|---|
| CA | 2691316 | 7/2010 |
| CA | 2800362 | 7/2013 |
| FR | 2719347 | 4/1994 |
| GB | 2045321 | 3/1979 |
| GB | 2284989 | 6/1995 |
| JP | 8-178404 | 7/1996 |

* cited by examiner

SECTION AT FLANGE
FIG. 5a

SECTION A-A
FIG. 5b

SECTION B-B
FIG. 5c

FIRE-RATED MODULAR DUCT ASSEMBLY AND IMPROVEMENTS THEREIN

BACKGROUND OF THE INVENTION

The present application relates to a duct assembly, and more particularly, to a fire-rated modular duct assembly, and improvements therein, suitable for exhausting flammable or hazardous gases, vapour and the like.

BACKGROUND OF THE INVENTION

Many processes in commercial and industrial facilities generate flammable or hazardous gases, vapors or particles. The hazardous material must be captured at the source and transported or moved through the facility (e.g. building) to a location where the material can be discharged, e.g. directly into the atmosphere, or into a collection or a treatment system within the building or exterior to the building.

In a typical facility, ventilation ducts are routed throughout the building. The ventilation ducts penetrate and cross fire separations, and typically comprise interior dampers installed within the fire separation section to prevent fire that penetrates the duct from travelling through the duct across the fire separators in the building. It will be appreciated that while such an implementation may be sufficient for the fire protection of ventilation ducts, ventilation or exhaust ducts for flammable or hazardous materials cannot be configured with fire dampers, so the duct itself must be fire-rated.

To be classified as a fire-rated duct, an exhaust duct must be capable of preventing the release of flammable materials from inside the duct and/or combustible materials adjacent the exterior of the exhaust duct from catching fire if a fire exists on the other side of the duct. In other words, a fire-rated duct must be capable of minimizing the transfer of heat through or across the duct walls. It is also desirable to maintain the wall thickness to a workable minimum.

Fire-rated ducts are typically found in installations such as commercial kitchens and laboratories.

In a commercial kitchen, the exhaust hoods are configured to capture grease laden air over deep fryers and grills, which is extremely flammable, and must be transported through the building to an exterior area where it can be safely discharged. Due to the flammable nature of the exhausted vapour, a minor fire, for example, in the kitchen could enter the exhaust duct and quickly spread throughout the duct system. As a result, any potential fire inside the duct system must be contained and thermal transfer through the duct walls limited to prevent ignition of adjacent combustible material in the kitchen or other areas of the building. In addition, the exhaust duct system must be capable of preventing the ignition of the grease laden air from a fire source in another part of the building and then spreading to the kitchen or other parts of the building where the exhaust duct system is routed.

In a laboratory installation, the exhaust system is configured to collect and exhaust chemical vapours, including vapours from chemicals with low flash points, and contain any fire inside the duct system, or prevent an external fire from igniting the vapour inside the duct system.

Known fire-rated exhaust duct systems are typically fabricated in sections, and the sections are shipped to the installation location. At the installation location, the sections are welded together to form continuous conduits or conduit sections. Due to field conditions, the welding could be of poor work quality, for instance, due to limited space and/or setup. This meant expensive rework and re-welding to seal leaks in the duct system during pressure testing. Conventional fire-rated duct systems typically require the installation of an additional gypsum fire-rated enclosure (approximately 10" thick) around the duct. In addition to requiring an additional step, the gypsum enclosure is typically constructed/installed by another trade.

In an attempt to overcome the known shortcomings in the art, chimney manufacturers introduced pre-fabricated fire-rated exhaust ducts based on a modification of existing chimney exhaust systems. While these pre-fabricated fire-rated exhaust ducts addressed shortcomings of existing systems, the characteristic round profile significantly limits the volume of air that can be vertically carried in conventional building footprints, and in a horizontal configuration, the round profile or cross section is often too large to fit into conventional ceiling space spaces or dimensions.

Accordingly, there remains a need for improvements in the art.

BRIEF SUMMARY OF THE INVENTION

The present invention comprises embodiments of a modular fire-rated duct system and improvements therein and suitable for pre-fabrication and configured for assembly in the field.

According to an embodiment, the present invention comprises a modular fire-rated exhaust duct assembly comprising: two or more exhaust duct modules; each of said exhaust duct modules having an inner duct liner and an outer casing, and a void being formed between at least a portion of space between said inner duct liner and said outer casing, said void being configured for receiving an insulation material, and including one or more thermal spacers configured to maintain said inner duct liner and said outer casing in a spaced relationship so that said insulation material occupies said void; a first exterior flange connector, and one end of each of said exhaust duct modules being configured for receiving said first exterior flange connector; a second exterior flange connector, and another end of each of said exhaust duct modules being configured for receiving said second exterior flange connector; said first and said second exterior flange connectors being configured to form a field assembly junction for coupling respective ends of said exhaust duct modules to form a single exhaust duct run; and a joint encasement section configured to be field connectable to each of said exhaust duct modules and encase said junction.

According to another embodiment, the present invention comprises an exhaust duct module configured to be assembled in the field to form a fire-rated exhaust duct assembly, said exhaust duct module comprising: an inner duct liner formed with a generally rectangular cross-section; an outer casing formed with a generally rectangular cross-section and being sized to substantially surround said inner duct liner and a void being formed between at least a portion of space between said inner duct liner and said outer casing, said void being configured for receiving an insulation material, and further including one or more thermal spacers configured to maintain said inner duct liner and said outer casing in a spaced relationship so that said material occupies said void; a first exterior flange connector, and one end of said exhaust duct module being configured for receiving said first exterior flange connector; a second exterior flange connector, and another end of said exhaust duct module being configured for receiving said second exterior flange connector; and said first exterior flange connector and said second exterior flange connector being configured to be field attachable to couple another exhaust duct assembly.

According to a further embodiment, the present invention comprises an exhaust duct module configured to be assembled in the field to form a fire-rated exhaust duct assembly, said exhaust duct module comprising: an inner duct liner formed with a generally rectangular cross-section; an outer casing formed with a generally rectangular cross-section and being sized to substantially surround said inner duct liner and a void being formed between at least a portion of space between said inner duct liner and said outer casing, said void being configured for receiving a compressible insulation material, and further including one or more thermal spacers configured to maintain said inner duct liner and said outer casing in a spaced relationship so that said compressible insulation material occupies said void; a first exterior flange connector, and one end of said exhaust duct module being configured for receiving said first exterior flange connector; a second exterior flange connector, and another end of said exhaust duct module being configured for receiving said second exterior flange connector; and said first exterior flange connector and said second exterior flange connector being configured to be field attachable to couple another exhaust duct assembly.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments according to the present application, and in which.

Like reference numerals indicate like or corresponding elements in the drawings.

DETAILED DESCRIPTION OF THE EMBODIMENTS

Figure 1:
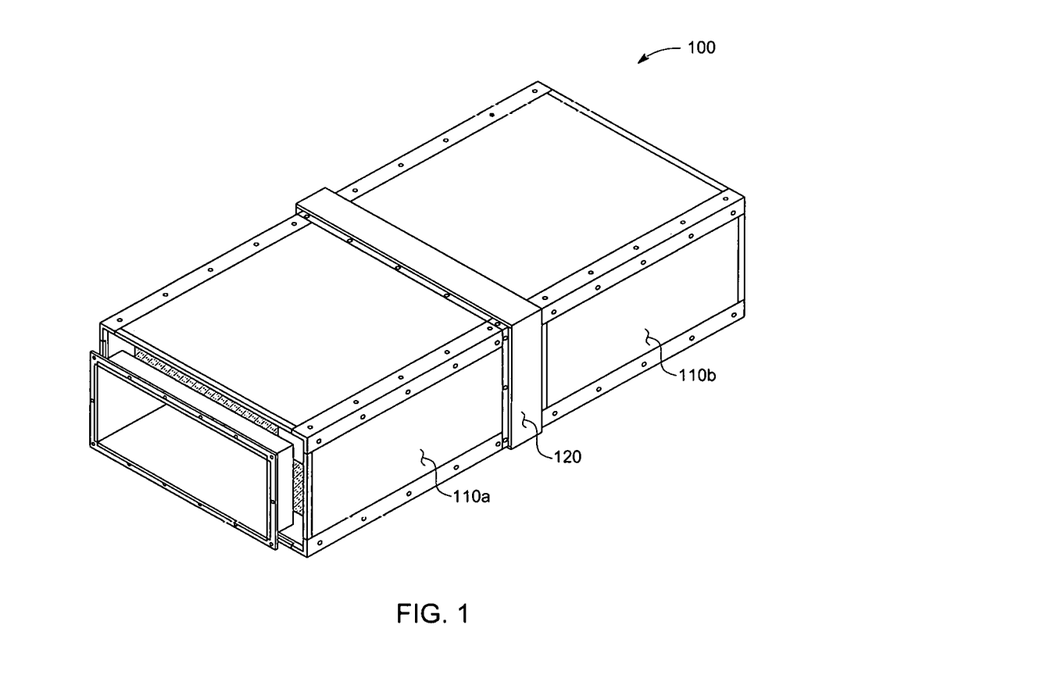
FIG. 1 is a perspective view of an exhaust duct system according to an embodiment of the present invention and comprising a rectangular configuration and two sections or modules.

Reference is first made to FIG. 1, which shows a fire-rated modular exhaust duct system or assembly according to an embodiment of the invention. The fire-rated modular exhaust duct is indicated generally by reference 100 and according to an embodiment comprises a plurality of exhaust duct sections or modules 110, indicated individually by references 110a and 110b, as shown in FIG. 1. The individual exhaust sections 110 are connected or coupled together with a mechanical joint indicated generally by reference 120 and described in more detail below. Embodiments of the modular fire-rated exhaust duct system or apparatus according to the present invention are suitable for installations or applications requiring fire-rated duct systems, such as exhaust duct systems for commercial applications, for instances, kitchens and restaurants, laboratories and other chemical or hazardous material processing facilities, as will be apparent to those skilled in the art.

Figure 2:
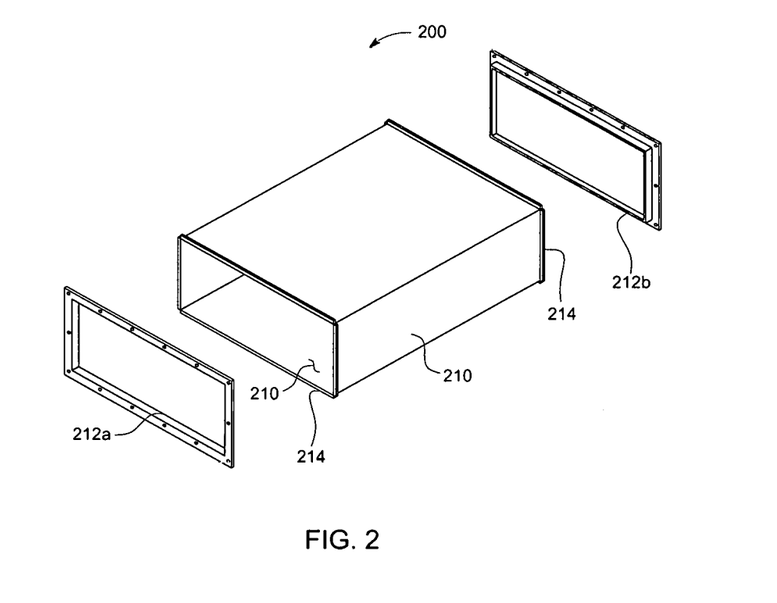
FIG. 2 is a perspective view of an inner exhaust duct liner according to an embodiment of the present invention.

Reference is next made to FIG. 2, which shows an inner exhaust duct liner assembly according to an embodiment of the present invention and indicated generally by reference 200. The inner exhaust duct liner assembly 200 comprises an inner duct liner 210, and external flanged connectors 212, indicated individually by references 212a and 212b.

Figure 4:
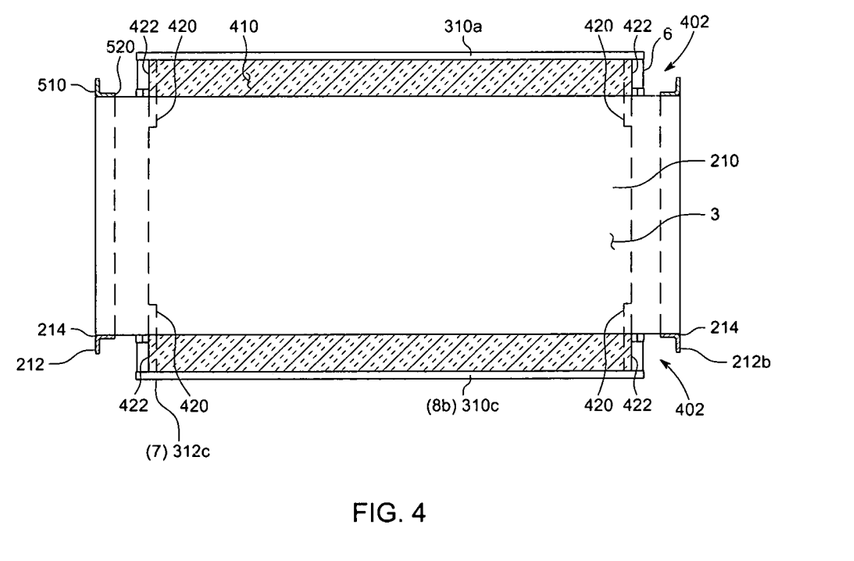
FIG. 4 is a longitudinal sectional view of the first section in FIG. 1 taken along line A-A.

As shown in FIGS. 2 and 4, the inner metallic duct 210 is formed with an outer return or flange at each end, indicated generally by reference 214. The flange 214 is configured to overlap a portion of the external flange connector 212. According to an exemplary implementation, the inner metallic duct 210 is fabricated from stainless, carbon or coated steels, and is formed into a tube with a square or rectangular profile or cross-section. According to requirements under the UL 2221 and ASTM E2336 standards, the minimum wall thickness for the inner metallic duct 210 is typically 18 gauge (ga) for stainless steel and 16 ga for carbon steels.

The inner metallic duct 210 can be fabricated or formed in a number of ways including: (1) forming a piece of metal into a tube; (2) forming two pieces of metal into "L" shaped sections and joining the two sections together to form a rectangle (or a square profile) tube; (3) forming a single piece of metal into a "U" shaped section and joining a flat piece of metal to the open end of the "U" shaped section; or (4) using four separate pieces or panels of steel and joining them to form a rectangular (or square) profile tube. The longitudinal joint or joints are continuously welded to provide a liquid and air tight seal between the edges of the panels. Other connection techniques, such as Pittsburgh type mechanical locks or pocket locks which are sealed with stitch welding, can be utilized as will be understood by one skilled in the art. Such techniques can provide mechanical strength to pass the fire exposure tests.

The flange 214 (FIGS. 2 and 4) is formed at each transverse end of the inner metallic duct 210 and serves to define the duct section length. The flange 214 is formed at a right angle and provides a smooth flat surface for coupling adjacent duct sections and assisting in providing a liquid and air-tight surface, as described in more detail below.

Figure 6:
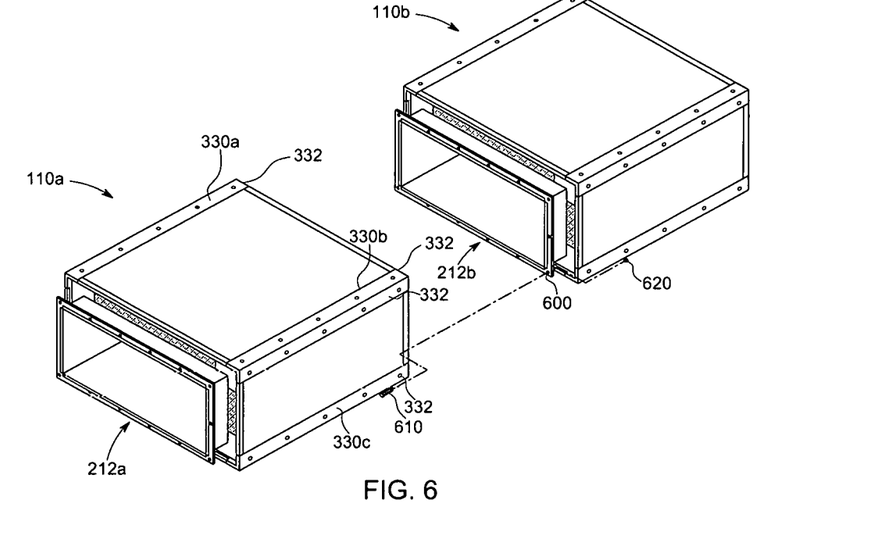
FIG. 6 is a perspective view of an inner exhaust liner comprising first and second modular sections and the configuration for joining the two sections according to an embodiment of the present invention.
Figure 8:
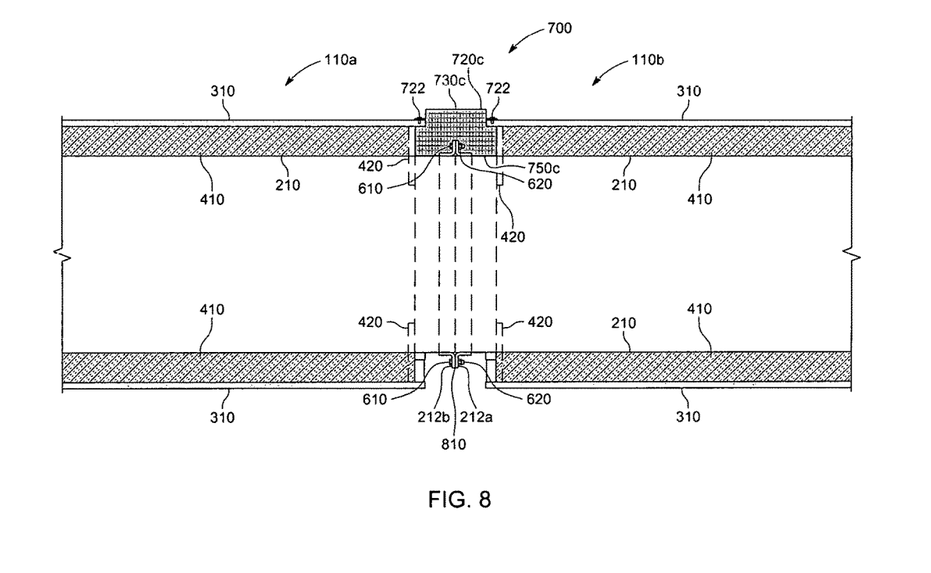
FIG. 8 is a longitudinal sectional view of the inner exhaust liner of FIG. 7 taken through line B-B.

According to an embodiment, the external flange connector 212 is formed or fabricated from the same type of metal as the inner metallic duct 210 in order to avoid the potential for galvanic action which can occur with the joining of dissimilar metals. According to an embodiment, the external flanged 212 comprises four individual sections that are formed into right angle sections (as shown for external flange connectors 212a and 212b in FIG. 2), for instance, from flat metal strips or cut from hot rolled right angle formed structural steel and which are cut into the required lengths for the top and bottom pieces and the side pieces. The corners of the four individual sections for each of the external flange connectors 212 are suitably mitered, or in the alternative square cut, to achieve closed corners in the external flange connector 212, and thereby allow the external flange connectors 212 to provide a better seal (liquid or air tight) at the joints formed from joining the external flange connectors 212 together for respective exhaust duct sections 110a and 110b (FIG. 1). The external flange connectors 212 are fabricated with a thickness sufficient to support the duct assembly and prevent the duct assembly from collapsing due to fire exposure, and for typical installations, will have a thickness in the range of 0.125" to 0.250", depending on the width or depth of the duct and/or the size of the flanged connection section. As shown in FIG. 2 and according to an exemplary implementation, each of the external flange connectors 212 includes six holes 600 (punched or drilled) at nominal 4" to 8" centers for receiving bolts 610 and corresponding nuts 620 for joining the duct sections 110 and 112 together, for example, as shown in FIGS. 6 and 8.

According to another aspect, the external flange connector 212 is formed by joining, for instance, welding, the four individual sections together. The external flange connectors 212 are then joined to the respective ends of the inner metallic duct 210, for instance, using a continuous weld or a stitch weld, at the outer flange or return 214 at a contact point or surface indicated generally by reference 510 in FIG. 5(a), and at the interface between the external flange connector 212 and the inner metallic duct 210 at a contact point or surface indicated generally by reference 520 in FIG. 5(b).

Figure 3:
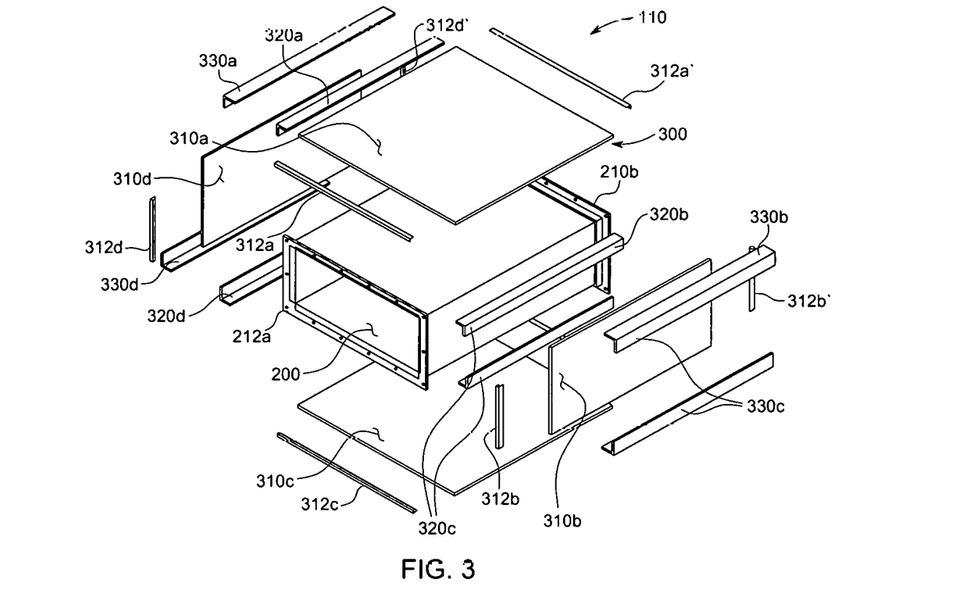
FIG. 3 is an exploded view of one the sections of FIG. 1.

Reference is next made to FIG. 3, which shows an exploded view of one of the exhaust duct modules or sections 110 according to an embodiment of the invention. The exhaust duct section 110 comprises the inner metallic duct 210, the first 212a and the second 212b external flange connectors (as described above), and an outer casing indicated generally by reference 300. According to another aspect, there is a void or space 402 between the outer casing 300 (i.e. the outer casing panels 310) and the inner duct assembly 200 (i.e. the inner metallic duct 210) that is filled with an insulating material indicated generally by reference 410 in FIG. 4. According to another aspect, the exhaust duct module or section 110 includes a thermal spacer indicated generally by reference 420 in FIG. 4, as will be described in more detail below. According to an embodiment, the outer casing 300 comprises separate metallic sheets (or fire resistant board panels as described below) or sections indicated individually by references 310a, 310b, 310c and 310d. According to another aspect, the outer casing 300 comprises inner connection angle members 320, indicated individually by references 320a, 320b, 320c and 320d in FIG. 3.

Figure 9:
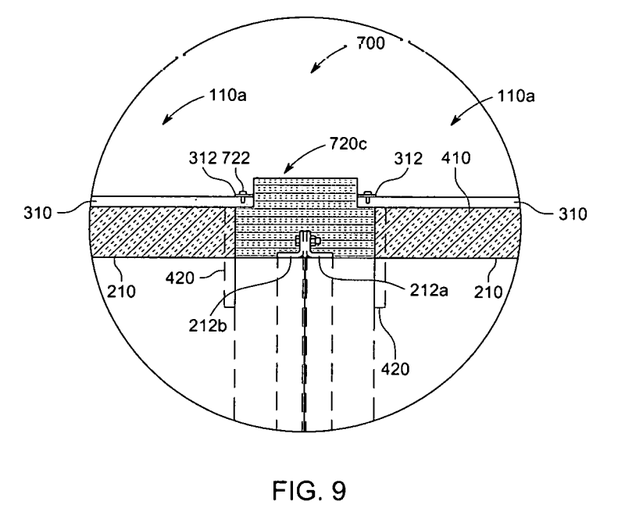
FIG. 9 is a partial and enlarged view of the joint encasement, i.e. the encased mechanical joint, for the inner exhaust liner of FIG. 7.

According to an embodiment of the present invention, the outer casing 300 may be formed as follows: (a) forming two pieces of metal into "L" sections and joining the L-formed sections together, for example, at the corners; (b) forming one piece of metal into "U" shaped section and joining a flat piece to the top corners of the "U" shaped section; (c) using four separate metallic and joining them together at the edges; or (d) using four separate panels or boards fabricated from a fire resistant material. The outer casing 300 further includes edge reinforcement members 312, indicated individually by references 312a, 312b, 312c and 312d. The edge reinforcement members 312 may comprise "J" shaped metallic edge reinforces which are configured to be fitted over the traverse edges of the respective outer casing panels 310. The edge reinforcement members 312 provide additional stiffness to the outer casing panel 310, for instance, when the outer casing panels 310 comprise fire resistant boards. The edge reinforcement members 312 also provide a metallic attachment point, for instance, for field installation of the joint encapsulation member 120 (as shown in FIGS. 1, 8 and 9). For outer casing panels 310 fabricated from a metallic material, the edge reinforcement members 312 may be formed directly in the traverse edge of the respective metallic sections or panels 310 of the outer casing 300.

Referring again to FIG. 3, for outer casing panels 310 formed from a metal or metallic material, the longitudinal edges may be connected using Pittsburgh or Button type mechanical locks or mechanisms as will be understood by those skilled in the art. According to another implementation, other connection mechanisms or techniques may be utilized, such as, pocket locks that are stitch welded or screwed to provide positive connection, or welding techniques, such as continuous welding of the panels, provide the resulting mechanical structure meets the required mechanical strength and/or fire exposure tests. For outer casing panels 310 formed from a fire resistant board, the outer casing 300 comprises outer flashing members 330, indicated individually by references 330a, 330b, 330c and 330d in FIG. 3. The outer flashing members 330 are configured to protect the edges of the fire resistant board panels 310 and according to an exemplary implementation, the outer flashing members 330 are fastened through the outer casing panel 310 and into the respective inner connection angle members 320, for example, using self-tapping screws or similar fasteners, indicated generally by reference 332 and shown in FIGS. 5(a), 5(b) and 5(c).

According to another aspect, the options as to size, shape, width-to-depth ratio, and types of insulating materials for configuring the exhaust duct modules or sections 110, the assembly and/or insulating of the outer casing assembly 300 may be performed in a number of ways, which can serve to simplify assembly. For a duct assembly with a smaller cross section, the inner metallic liner 210 may be wrapped with a blanket type insulating material 410 prior to assembly of the outer casing assembly 300 around the inner duct assembly 200. For a duct assembly with a larger cross section, or where the insulating material 410 comprises a batt-type or blanket type insulation (or a board type insulation), the outer casing assembly 300, i.e. the outer casing panels 310, may be assembled into a "U" shaped section (e.g. formed from the outer casing panels 310b, 310c and 310d in FIG. 3), followed by the insulating material 410 for the bottom horizontal section (i.e. the outer casing panel 310c (FIG. 4). The inner duct assembly 200 would then be positioned inside the "U" shaped section for the outer casing 300 and supported at the bottom corners by the thermal spacers 420, for example, as shown in FIG. 4. The void between the two respective side outer panels 310b and 310c, and the top panel of the inner metallic liner 210 would then be insulated and two thermal spacers 420 would be positioned to support the top outer panel 310a and the top outer panel 310a would be installed and affixed as described above.

Figure 5A:
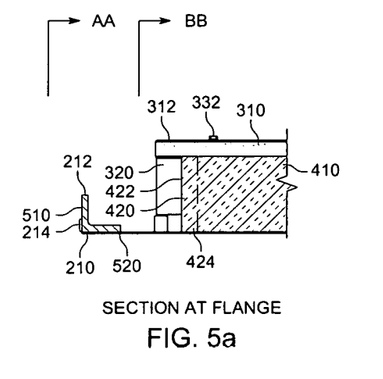
FIGS. 5(a) to 5(c) show a thermal spacer configuration according to an embodiment of the present invention.
Figure 5B:
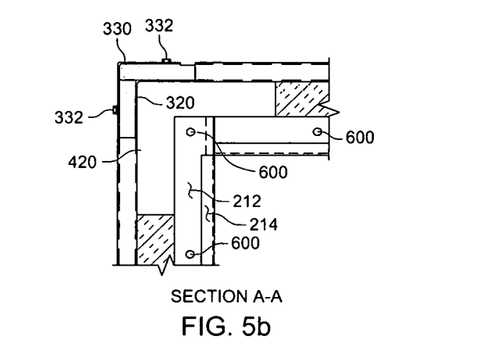
Figure 5C:
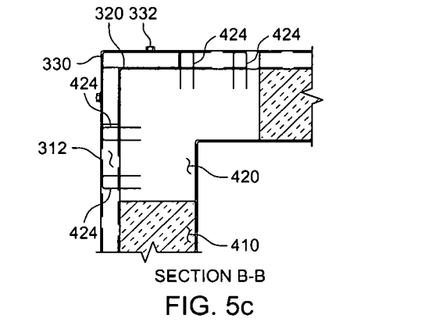

According to another aspect and as depicted in FIGS. 4 and 5(a), the thermal spacers 420 are recessed into the insulation material 410 in order to maintain or provide a flat insulation face indicated by reference 422 in FIGS. 4 and 5(a). According to another aspect, the flat insulation face 422 is inset from the transverse edge of the respective outer casing panel 310, for example, the top 310a and the bottom 310c outer casing panels as shown in FIG. 4. Once the thermal spacers 420 are correctly positioned, the spacers 420 are secured or connected to the outer casing panels 310 using staples or screws indicated generally by reference 424 in FIG. 5(c), or a suitable adhesive, to ensure that the thermal spacers 420 stay in the desired position for supporting the outer casing panels 310 and maintaining the gap or void so that the insulating material 410 is not unnecessarily compressed or crushed. For a duct assembly with a smaller cross section, the thermal spacers 420 may be positioned or located at the corners, for example, as shown in FIG. 5(b). For a duct assembly with a larger cross section, additional thermal spacers may be positioned along the space between the outer casing panels 310 and the inner metallic liner 210 to provide additional support and maintain the space or separation for the insulating material 410.

Figure 7:
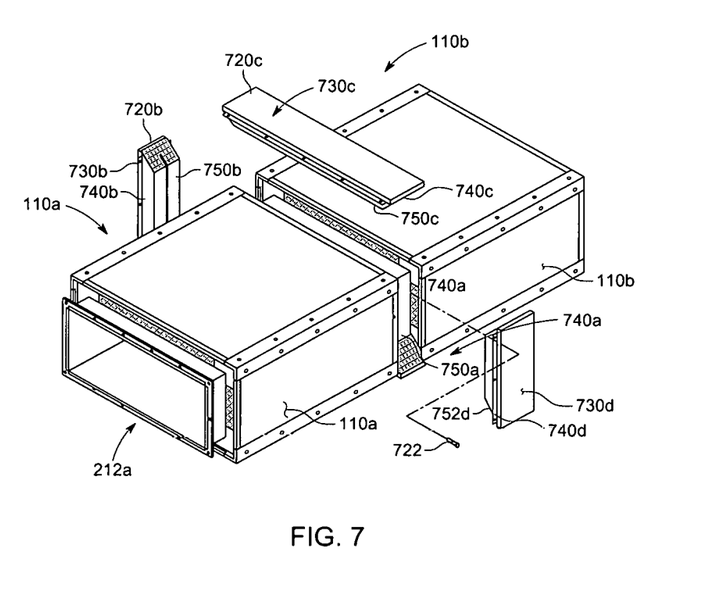
FIG. 7 is a perspective of the inner exhaust liner of FIG. 6 showing a configuration for thermally encasing the mechanical joint between the first and second modular sections according to an embodiment of the present invention.

Reference is made back to FIG. 1 and as shown, the two exhaust duct sections 110a and 110b are joined or coupled together by the mechanical joint 120. According to an embodiment, the mechanical joint 120 comprises a joint encasement having a configuration as shown in FIGS. 7, 8 and 9, and is indicated generally by reference 700. The joint encasement 700 is configured to encase or surround the joint formed between two adjacent exhaust duct sections 110a and 110b when the exterior flange connectors 212 are connected together, for example, bolted.

As shown in FIG. 7, joint encasement 710 comprises four sections 720, indicated individually by references 720a, 720b, 720c and 720d. Each of the sections 720 comprises a formed outer metallic profile 730 and an insulating material (or layers of insulating material) 740. The insulating material 740 is affixed to the inner face or side of the outer metallic layer 730 using suitable adhesives and/or mechanical fasteners, in order to provide for pre-fabrication at the factory and thereby minimize the number of components transported to and assembled on site. However, there may be applications where size and weight limitations and/or characteristics of the insulating material 740 may require the insulating material 740 and the outer metallic profile 730 be kept as separate components and then field installed over joint between the exhaust duct sections 110. As shown in FIGS. 8 and 9, the outer metallic layer 730 has a width sufficient to overlap the transverse edges of the outer casing panels 310. According to another aspect, the sections 720 having longitudinal edges formed with a safety or hemmed edge in order to stiffen the edge so that it lies flat against the outer casing panel 310 when installed.

As shown in FIGS. 8 and 9, the joint encasement sections 720 comprise a hat configuration having a channel-like configuration with flanges or returns 760 formed outward from the legs of the channel to create an attachment surface or points for connecting to the outer casing panels 310 using fasteners 722, for example, screws, through holes (i.e. punched through holes) in the flanges 760. According to another aspect, a thermal gasket indicated by reference 724 in FIG. 9 can be included to thermally isolate the joint encasement sections 720 from the outer casing panel 310.

In accordance with an exemplary embodiment, the fire-rated exhaust duct sections 110 and encasement joint 120 is fabricated and assembled on a component level as described above in the factory and delivered to the installation site. According to an exemplary embodiment, a 0.250 to 0.500 inch diameter bead of high temperature sealant may be applied to the face of one of the exterior flange connectors 212 adjacent the edge of the flange or return 214 (FIG. 4(a)) on the inner metallic duct 210. The second duct section 110b is aligned with the first duct section 110a and brought together so that the faces of the flanges 212 on both of the inner metallic ducts 210 are in contact. The bolts 610 (FIG. 6) are then installed through each hole 600 in the exterior flange connector 212 and the bolts 610 are secured by the nuts 620 (FIG. 6). The fasteners are tightened in a circular and progressive manner to a torque setting defined by the exhaust duct manufacturer's specifications, for example, according to fastener size being utilized. Once the adjacent exhaust duct sections 110a and 110b are connected together, the encapsulation sections 720 are installed. Each encapsulation section 720 is fitted into the space between the outer casing panels 310 of the adjacent duct sections 110a and 110b until the outer metallic layer 730 comes into contact with outer casing panel 310. The outer metallic layer 730 is secured to the outer casing panel 310 using the screws 722, which may be drilled and threaded into the outer casing panel 310 (metal) through pre-drilled or punched holes. This procedure is repeated for each exhaust duct section until the duct assembly extends from the source of vapours, gases or materials to the point of discharge or treatment.

In summary and according to another embodiment, the present invention comprises an exhaust duct system comprising a plurality of individual duct sections which are factory fabricated and then mechanically assembled on site. The void is configured with thermal spacers to prevent the insulation from being unduly compressed or crushed. This eliminates the need to do on site fabrication of the duct sections, e.g. welding and other hot work. The exhaust sections are connected together to form longer sections and runs to create a fire-rated exhaust duct system in a building or other type of facility for exhausting or moving flammable or hazardous gases, vapours and materials from an originating source, e.g. an exhaust hood or another duct inlet, to a location where the flammable or hazardous gases, vapours or materials can be safely discharged, for example into the atmosphere, or into a collection or treatment system. According to an embodiment, the exhaust duct system is configured to utilize batted insulation material which is carried in a void between the inner duct liner and the outer casing. According to another embodiment, the outer casing comprises non-metallic fire resistant panels.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:
1. A modular fire-rated exhaust duct assembly comprising:
two or more exhaust duct modules;
each of said exhaust duct modules having an inner duct liner and an outer casing, and a void being formed between at least a portion of space between said inner duct liner and said outer casing, said void being configured for receiving an insulation material, and including one or more thermal spacers configured to maintain said inner duct liner and said outer casing in a spaced relationship so that said insulation material occupies said void, said one or more thermal spacers thermally isolating said inner duct liner from said outer casing;
a first exterior flange connector, said first exterior flange connector being joined directly to one end of said inner duct liner, and one end of each of said exhaust duct modules being configured for receiving said first exterior flange connector;
a second exterior flange connector, said second exterior flange connector being joined directly to one end of said inner duct liner, and another end of each of said exhaust duct modules being configured for receiving said second exterior flange connector;

said first and said second exterior flange connectors being configured to form a field assembly junction for coupling respective ends of said exhaust duct modules to form a single exhaust duct run; and a joint encasement section configured to be field connectable to each of said exhaust duct modules and encase said junction.

2. The modular fire-rate exhaust duct assembly as claimed in claim 1, said outer casing comprises one or more panels formed from a fire resistant non-metallic material.

3. The modular fire-rated exhaust duct assembly as claimed in claim 1, wherein said exhaust duct modules have a generally rectangular cross-section.

4. The modular fire-rated exhaust duct assembly as claimed in claim 2, wherein said inner duct liner comprises a return flange configured to be affixed to said first and said second exterior flange connectors.

5. The modular fire-rated exhaust duct assembly as claimed in claim 1, wherein said field assembly junction comprises a plurality of holes in each of said first and said exterior flanges, said plurality of holes being in alignment on said first and said exterior flanges, and being configured to receive a detachable fastener.

6. The modular fire-rated exhaust duct assembly as claimed in claim 1, wherein said inner duct liner and said outer casing are formed from a metallic material, and each having a thickness to provide a specified fire rating.

7. The modular fire-rated exhaust duct assembly as claimed in claim 1, wherein said joint encasement section comprises a plurality of joint encasement sections, each of said joint encasement sections comprising an outer layer and an inner layer, and said outer layer having a flange on each longitudinal edge for affixing said encasement section to respective ends of said adjacent exhaust duct modules.

8. The modular fire-rated exhaust duct assembly as claimed in claim 7, wherein said outer casing is formed from a metallic material having a thickness sufficient to provide a specified fire rating and said outer layer of said joint encasement section comprises the same metallic material.

9. The modular fire-rated exhaust duct assembly as claimed in claim 8, wherein said joint encasement sections are configured to be field attachable to said respective surfaces of the said exhaust duct modules.

10. An exhaust duct module configured to be assembled in the field to form a fire-rated exhaust duct assembly, said exhaust duct module comprising:

an inner duct liner formed with a generally rectangular cross-section;

an outer casing formed with a generally rectangular cross-section and being sized to substantially surround said inner duct liner and a void being formed between at least a portion of space between said inner duct liner and said outer casing, said void being configured for receiving an insulation material, and further including one or more thermal spacers configured to maintain said inner duct liner and said outer casing in a spaced relationship so that said material occupies said void, said one or more thermal spacers thermally isolating said inner duct liner from said outer casing;

a first exterior flange connector, said first exterior flange connector being joined directly to one end of said inner duct liner, and one end of said exhaust duct module being configured for receiving said first exterior flange connector;

a second exterior flange connector, said second exterior flange connector being joined directly to one end of said inner duct liner, and another end of said exhaust duct module being configured for receiving said second exterior flange connector; and said first exterior flange connector and said second exterior flange connector being configured to be field attachable to couple another exhaust duct assembly.

11. The exhaust duct module as claimed in claim 10, further including a thermal insulation material substantially filling said void space between said inner duct liner and said outer casing.

12. The exhaust duct module as claimed in claim 11, wherein said inner duct liner and said outer casing are formed from a metallic material, and each having a thickness to provide a specified fire rating.

13. The exhaust duct module as claimed in claim 12, wherein said thermal insulation material comprises one of a batt insulation material and an insulation board.

14. The exhaust duct module as claimed in claim 11, wherein said outer casing comprises one or more panels formed from a fire resistant non-metallic material.

15. The exhaust duct module as claimed in claim 14, wherein said thermal insulation material comprises one of a batt insulation material, a blanket insulation and an insulation board.

16. An exhaust duct module configured to be assembled in the field to form a fire-rated exhaust duct assembly, said exhaust duct module comprising:

an inner duct liner formed with a generally rectangular cross-section;

an outer casing formed with a generally rectangular cross-section and being sized to substantially surround said inner duct liner and a void being formed between at least a portion of space between said inner duct liner and said outer casing, said void being configured for receiving a compressible insulation material, and further including one or more thermal spacers configured to maintain said inner duct liner and said outer casing in a spaced relationship so that said compressible insulation material occupies said void, said one or more thermal spacers thermally isolating said inner duct liner from said outer casing;

a first exterior flange connector, said first exterior flange connector being joined directly to one end of said inner duct liner, and one end of said exhaust duct module being configured for receiving said first exterior flange connector;

a second exterior flange connector, said second exterior flange connector being joined directly to another end of said inner duct liner, and another end of said exhaust duct module being configured for receiving said second exterior flange connector; and said first exterior flange connector and said second exterior flange connector being configured to be field attachable to couple another exhaust duct assembly.

17. The exhaust duct module as claimed in claim 16, wherein said outer casing comprises one or more panels formed from a fire resistant non-metallic material.

18. The exhaust duct module as claimed in claim 17, wherein said thermal insulation material comprises one of a batt insulation material, a blanket insulation material and an insulation board.

19. The exhaust duct module as claimed in claim 16, wherein said inner duct liner and said outer casing are formed from a metallic material, and each having a thickness to provide a specified fire rating.

20. The exhaust duct module as claimed in claim 19, wherein said thermal insulation material comprises one of a batt insulation material, a blanket insulation material and an insulation board.

\* \* \* \* \*